United States Patent [19]
Huang

[11] Patent Number: 5,875,571
[45] Date of Patent: *Mar. 2, 1999

[54] INSOLE PAD HAVING STEP-COUNTING DEVICE

[76] Inventor: Tien-Tsai Huang, No. 4-2, Lane 30, Wu Chuan St., Pan Chiao City, Taipei, Taiwan

[*] Notice: The term of this patent shall not extend beyond the expiration date of Pat. No. 5,661,946.

[21] Appl. No.: 964,149
[22] Filed: Nov. 6, 1997
[51] Int. Cl.⁶ .............................. A43B 5/00; A43B 13/20
[52] U.S. Cl. .................... 36/132; 36/29; 73/172
[58] Field of Search .............. 36/29, 132, 136, 36/137, 139; 73/172, 714

[56] References Cited

U.S. PATENT DOCUMENTS

| | | | |
|---|---|---|---|
| 3,702,999 | 11/1972 | Gradisar | 36/139 |
| 3,974,491 | 8/1976 | Sipe | 36/132 |
| 5,195,254 | 3/1993 | Tyng | 36/29 |
| 5,230,249 | 7/1993 | Sasaki et al. | 36/132 |
| 5,471,405 | 11/1995 | Marsh | 36/114 |
| 5,655,316 | 8/1997 | Huang | 36/132 |
| 5,661,916 | 9/1997 | Huan | 36/132 |
| 5,673,500 | 10/1997 | Huan | 36/136 |

*Primary Examiner*—M. D. Patterson
*Attorney, Agent, or Firm*—Bacon & Thomas, PLLC

[57] ABSTRACT

An insole pad having step-counting device includes an insole pad body, a fluid bag, a connecting portion, a pressure-sensitive sensor, a thermostat, a transmitting circuit, and a receiving circuit. The fluid bag has an outlet, and is filled with fluid. The connecting portion is connected to the outlet of the fluid bag. The pressure-sensitive sensor and the thermostat are disposed within the connecting portion to contact directly with the fluid to detect the variation of pressure and temperature, respectively. The detected variation of pressure and temperature can be converted into pressure and temperature signals respectively. The sensor and thermostat are connected to a transmitting circuit in which the pressure and temperature signals can be received and processed. The signals are further converted into a value that can be transmitted in an RF signal. The RF signal can be collected by a receiving circuit and is further modulated, decoded, controlled and finally displayed on a liquid crystal display.

15 Claims, 9 Drawing Sheets

INSOLE PAD HAVING STEP-COUNTING DEVICE

FIELD OF THE INVENTION

The present invention relates to an insole pad, more particularly, to an insole pad in which a step counting device is incorporated with, by this counting device the weight of the user, walking mileage, and the calories consumed can be calculated through the insole pad which is incorporated with radio transmitter and receiver.

DESCRIPTION OF PRIOR ART

As our modern society enjoys a great prosperity, we have a variety of food in our daily meals. However, we are too busy to have a chance to take exercise. In light of this, too much nutrition has been accumulated in our body, making us too fat, i.e. too many calories have been accumulated in our body. Accordingly, physicians advise modern people to take a suitable exercise every day to consume a certain amount of calories.

According to medical report, if we take one-hour walk in an average speed of 4 km/hour, about 2 k calories will be consumed. If we take a fast pace at a speed of 6.4 km/hour, then about 3.4 k calories will be consumed. If we walk faster at a speed of 8.5 km/hour, then about 9.3 k calories will be consumed. A modern man or woman will no doubt enjoy a good health if he or she takes a walk everyday.

Normally, we can read our weight through a weighting meter. However since the weighting meter is not portable, we cannot measure our weight through it during the walk or taking an exercise. Our walk steps can be readily measured by a walk counter. However, the walk counter is not an indispensable article and the user may always forget to bring it with. As a result, how many steps have been walked is difficult to calculate. On the other hand, the conventional and existing walk-step counter should preset a certain mileage according to the weight of the user before the walk is commenced.

The inventor has applied for patent designated as Taiwan Utility Model Patent No. 84216806, entitled "Electronic Weight Shoes". This application has been allowed.

The inventor has also filed another Taiwan utility model patent application numbered 86205954, entitled "Electronic Step-Counting Shoe", which is still pending at the present stage.

However, in order to provide a more compact and convenient step-counting device, the present invention is provided. According to the disclosure, the weight of the user, mileage or walking steps and the consumed calories are calculated by multiplying the mileage and the weight. Furthermore, the user can readily access to the weight, the mileage and the consumed calories.

SUMMARY OF THE INVENTION

An object of the invention is to provide an insole pad having step-counting device in which an insole pad is incorporated with a step-counting device, so that the weight of the user, the mileage, and the calories being consumed can be readily calculated.

Still an object of the invention is to provide an insole pad having step-counter device in which an individual radio frequency (RF) receiving circuit, with which the signals transmitted from an RF transmitting circuit disposed within an insole pad body, can be readily received. The received RF signals can be readily displayed on a liquid crystal display so as to advise the user the instant situation.

The insole pad having step-counting device includes an insole pad body, a fluid bag, a connecting portion, a pressure-sensitive means (sensor), a thermostat, a transmitting circuit, and a receiving circuit.

The shape of the insole pad body can be readily formed to meet the left or right foot of the user. The fluid bag, the connecting portion, the sensor, the thermostat, and the transmitting circuit are all disposed within the insole pad body.

The fluid bag includes at least an outlet which is connected to the connecting portion. The fluid bag is filled with fluid, such as gas, i.e. air or nitrogen; or liquid, i.e. liquid or oil, or even silicon rubber. The shape of the fluid bag is required to conform to the change of the insole pad body.

The sensor and the thermostat are electrically connected and are disposed on the connecting portion for a direct contact with the fluid. The sensor and the thermostat can readily detect the variation of pressure and temperature, respectively. The variation of pressure and temperature can be converted into pressure and temperature signals respectively.

The transmitting circuit is disposed within the insole pad body and is electrically connected with the sensor and the thermostat respectively. The pressure and temperature signals collected can be further amplified and converted into frequency signals that can be further converted into a value. This value can be further transmitted.

The receiving circuit is separately arranged with the transmitting circuit. The signals transmitted from the transmitting circuit can be collected and then modulated, amplified, and finally displayed. The receiving circuit can be mounted in a watch for the user to readily access to the information converted from the frequency signals. The receiving circuit can also be disposed on a necklace or else.

By incorporating a pressure sensor and a thermostat in the insole pad body, the variation of pressure and numbers of stepping can be readily calculated. Eventually, the approximate consumed calories can be calculated. The transmitting circuit can transmit this information, and the receiving circuit collects the information. Accordingly, the weight of the user, the mileage, and the calories being consumed can be readily measured.

BRIEF DESCRIPTION OF DRAWINGS

FIG. 7 is a schematic illustration of a watch in which the receiving circuit is built-in.

DETAILED DESCRIPTION OF PREFERRED EMBODIMENT

Figure 1:
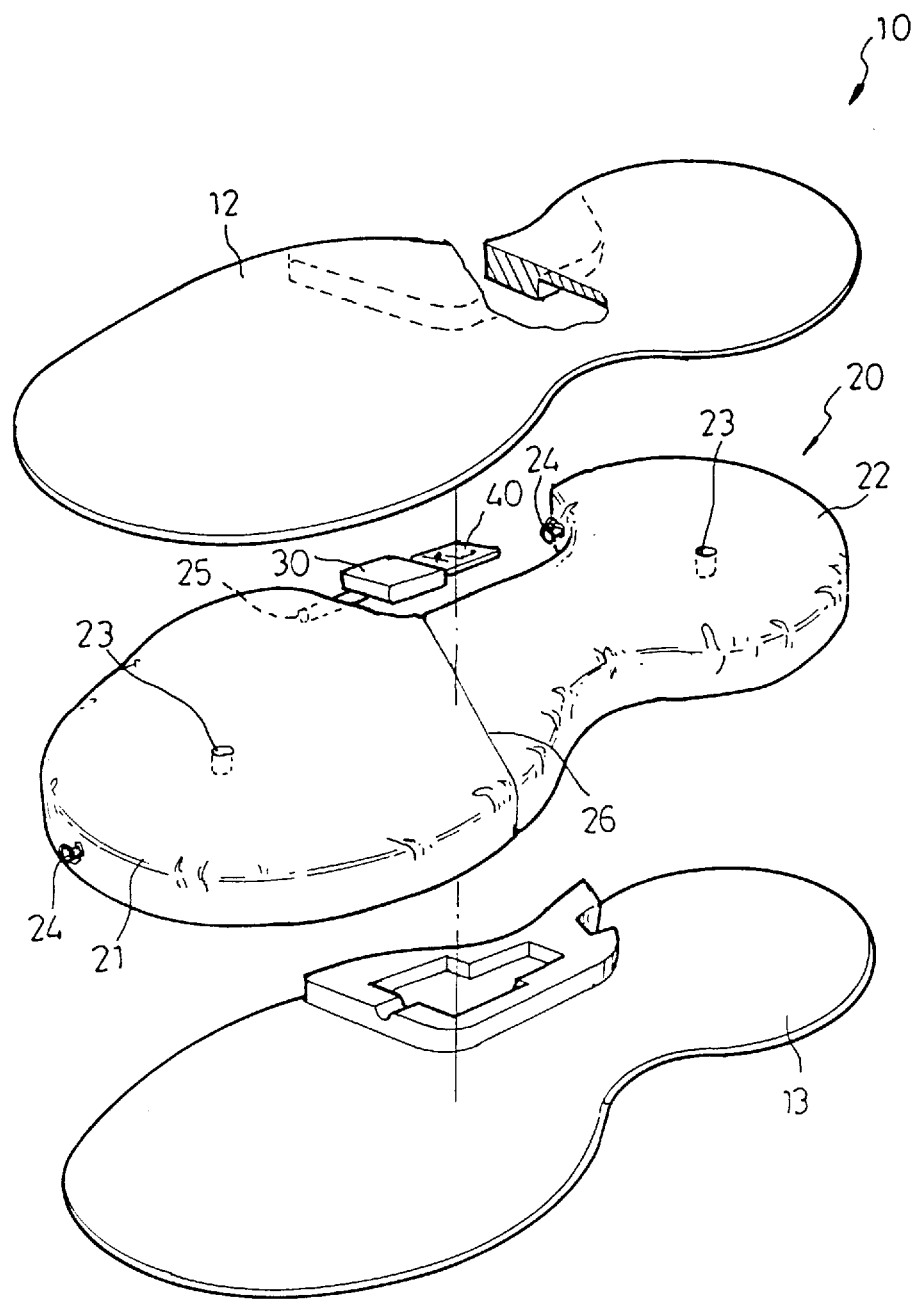
FIG. 1 is an exploded perspective view of the insole pad according to the present invention.

Referring to FIG. 1, the insole pad having a radio transmitter and receiver generally comprises an insole pad body 10, a fluid bag 20, a connecting portion 30, a pressure-sensitive sensor 45 (not shown in FIG. 1), a thermostat 50 (not shown in FIG. 1), a transmitting circuit 40, and a receiving circuit 70 (not shown in FIG. 1).

Figure 2:
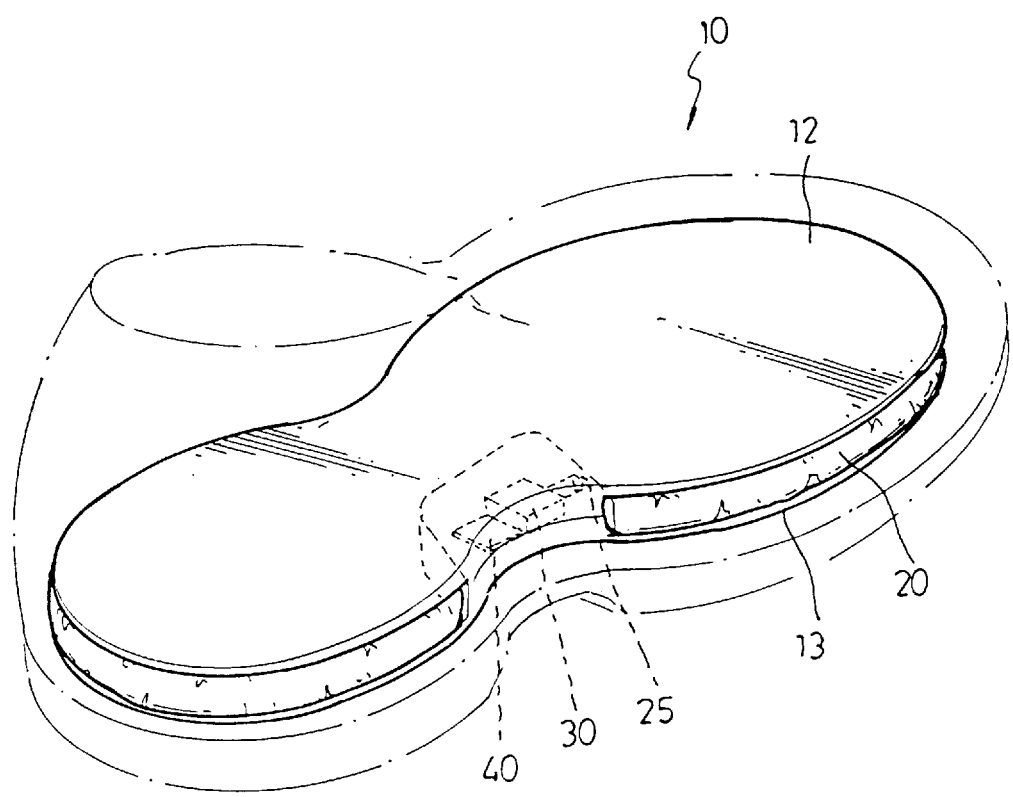
FIG. 2 is a perspective view of the insole pad.
Figure 3:
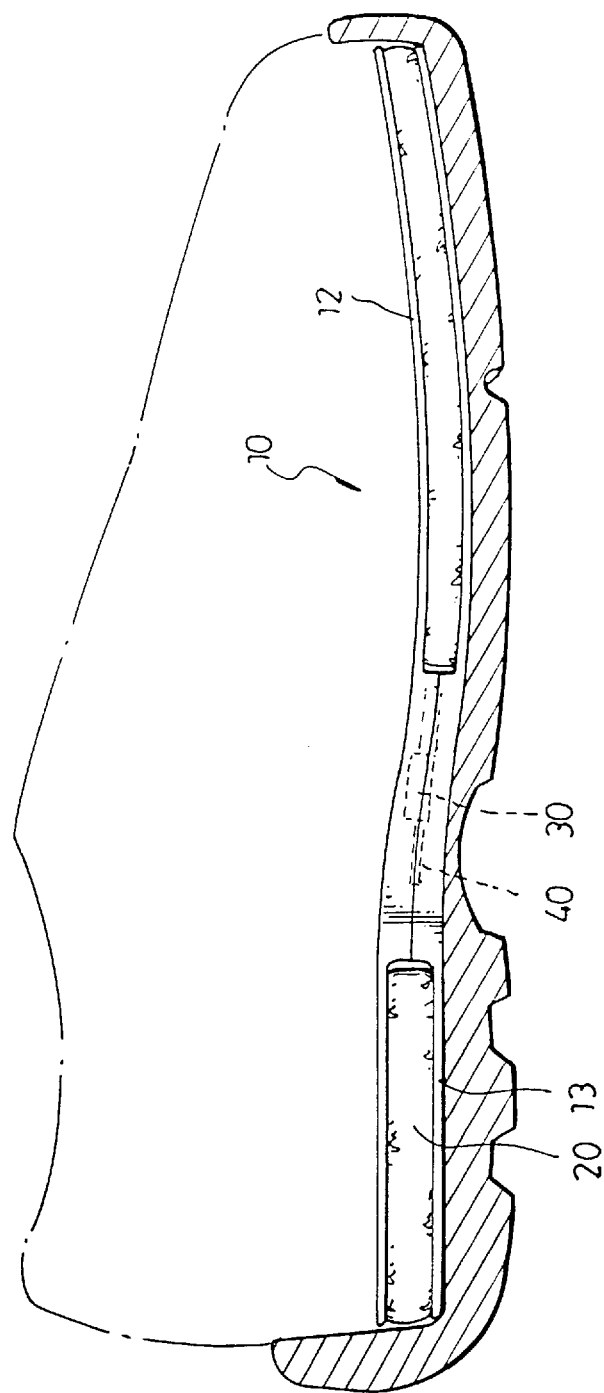
FIG. 3 is a side cross sectional view of the insole pad.

Referring to FIGS. 1 to 3, the insole pad body 10 includes an upper protecting lining 12 and a lower protecting lining 13, and the fluid bag 20 is disposed there between. The fluid bag 20 is filled with fluid. The connecting portion 30, the sensor 45, the thermostat 50 and the transmitting circuit 40 are all installed onto the insole pad body 10. Of course, the insole pad body 10 can also be a single upper protecting lining 12 or lower protecting lining 13.

Figure 1A:
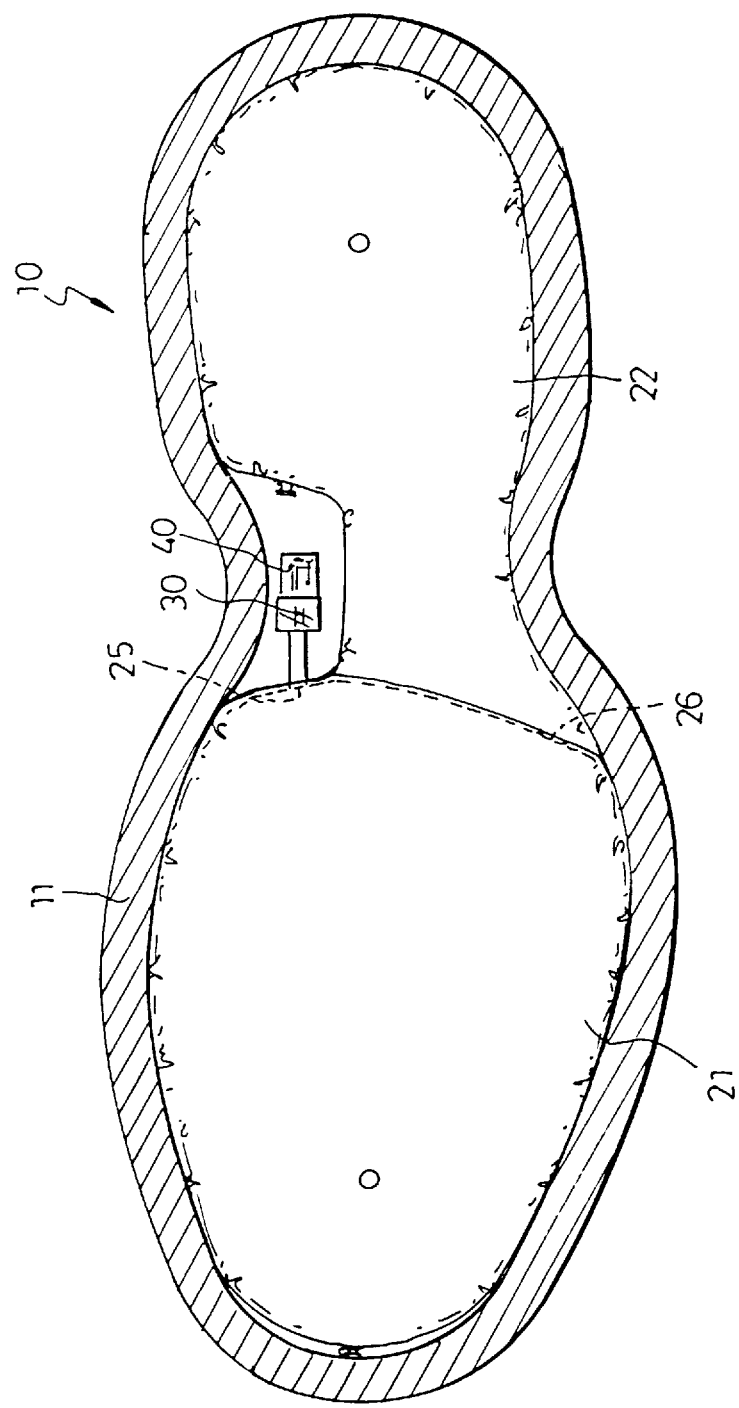
FIG. 1A is a schematic illustration showing another embodiment of the insole pad.

As shown in FIG. 1A, the insole pad body 10 is a hollow lining 11 in which the fluid bag 20, the connecting portion 30, the sensor 45, the thermostat 50 and the transmitting circuit 40 can be disposed.

Referring to FIG. 1, the fluid bag 20 can be divided into a front chamber 21 and a rear chamber 22 by means of a partition 26. The front chamber 21 of the fluid bag 20 is provided with an outlet 25. Each of the front and rear chambers 21, 22 is provided with a reinforced rib 23 and a nozzle 24, wherein the reinforced rib 23 serves as enhancing the rigidity of the insole pad body 10. The nozzle 24 serves as an inlet for fluid.

In this embodiment, the outer portion of the connecting portion 30, the sensor 45, and the thermostat 50 are made by the same material. By this arrangement, the connecting portion 30, the sensor 45 and the thermostat 50 can be joined together by means of heat-sealing or by adhesive. Besides, in order to detect the variation of the pressure and the temperature within the fluid bag 20, the sensor 45 and the thermostat 50 can be disposed within the fluid bag 20 such that it can be directly contacted with the fluid.

When the user wears the shoes and walk, at least one of which is inserted with this insole pad, the overall weight of the user will exert onto the fluid bag 20. As the sensor 45 is connected with the fluid bag 20, the sensor 45 can detect the variation of the pressure within the fluid bag 20 in response to the weight of the user. Besides, the thermostat 50 can also detect the variation of the temperature within the fluid bag 20. The detected variations of the pressure and temperature can be converted into a signal, respectively.

Figure 4:
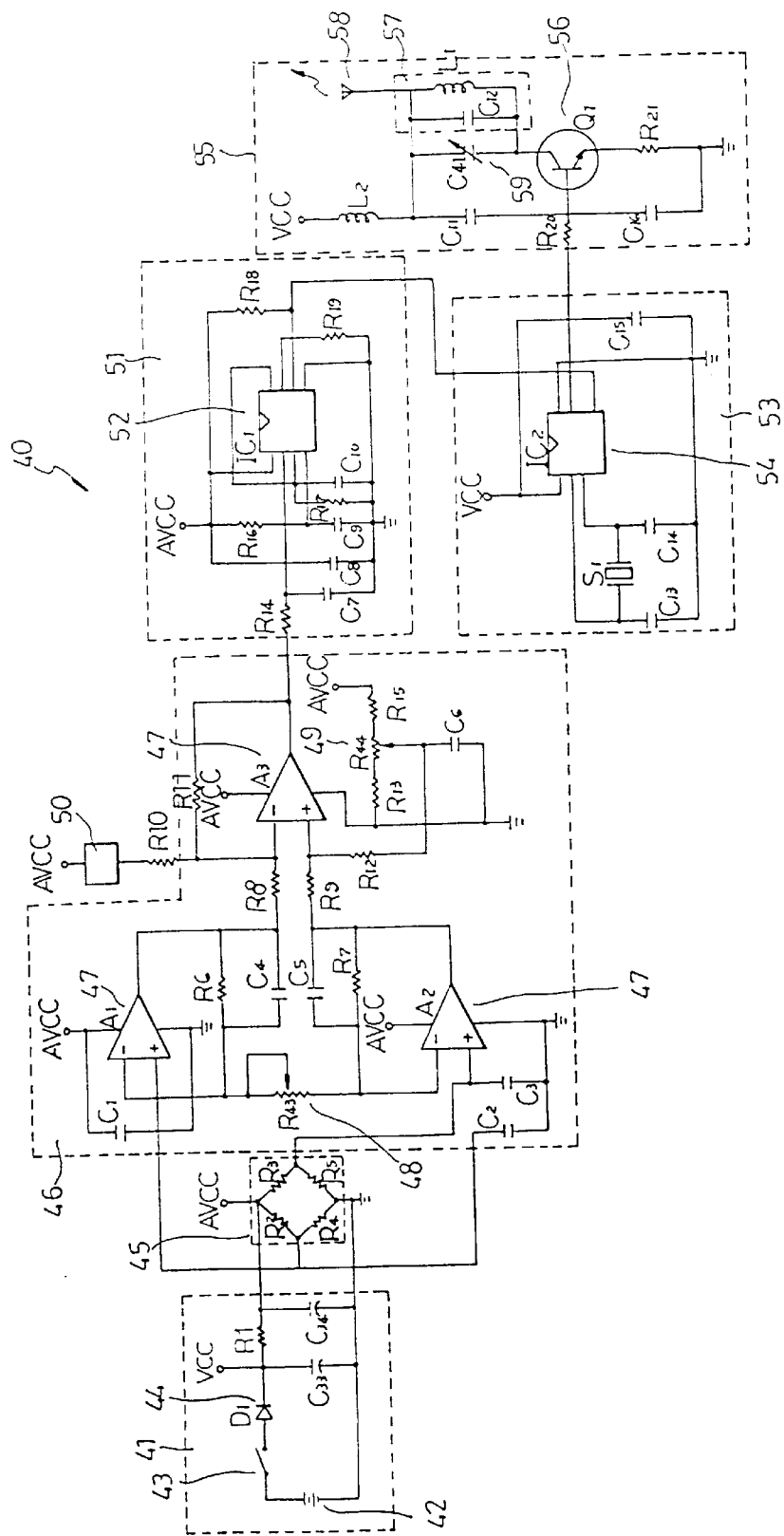
FIG. 4 is a circuitry of the transmitting circuit of the step-counting device.

Referring to FIG. 4, the transmitting circuit 40 includes a first power circuit 41, a first amplifying circuit 46, a converting circuit 51, a first micro-controlling circuit 53, and a radio transmitting circuit 55.

In this embodiment, the first circuit 41 includes a pair of first cells 42, a first switch 43, and a breaker 44. The first cell 42 includes a pair of 1.5 V dc batteries, which are connected in series. Mercury or lithium batteries can also be used to provide the power required by the transmitting circuit 40. The first switch 43 is used to control the on/off of the power circuit 41. The power can be suitably switched off when not in use. The breaker 44 is a Ge-diode D1. The circuit can be suitably protected when the polarity of the first cell 42 is reversed.

In this embodiment, the first amplifying circuit 46 includes three amplifiers 47, a power adjusting element 48, and a reset element 49. The sensor 45 and the thermostat 50 are electrically connected to the first amplifying circuit 46. The amplifier 47 is commercially available and the model number is TL074N, which is an OP operational amplifier. The pressure and temperature signals sent from the sensor 45 and the thermostat 50 can be amplified and then are sent to the converting circuit 51. The signals can be amplified up to 250 times. The amplifying voltage power is controlled and adjusted by the power-adjusting element 48. Besides, when the insole pad body 10 is lifted from the ground, the pressure signal can be reset to zero by the reset element 49.

The converting circuit 51 includes at least a converter 52. The pressure and temperature signal transmitted from the first amplifying circuit 46 will be sent to the converting circuit 51. These pressure and temperature signals will then be converted into a frequency signal, respectively, by the converter 52, and which are then sent to a micro-control circuit 53. In this embodiment, the converter 52 is commercially available and the model number is XR-4151, V-F converter.

The first micro-control circuit 53 includes a first micro-controller 54. The first micro-control circuit 53 can calculate the frequency signal so as to get a final value. The value includes the detected pressure, the number of stepping, and consumption of calories. These values will finally be sent to the radio transmitting circuit 55. In this embodiment, the first micro-controller 54 is a commercially available and the model number is PIC12C508.

Those pressure, number of stepping, and the approximate calories consumed are calculated from the following.

1. Variation of Pressure

The sensor 45, first detects the variation of the pressure, and this detected variation will be converted into a signal which can be transformed into a value by the first micro-controller 54. Accordingly, the weight of the user can be calculated. However, when the power of the transmitting circuit 40 is shut off, this pressure will be reset.

2. Number of Stepping

The micro-controller 54 is preset with a threshold and when the pressure value detected by the sensor 45 is smaller than this threshold, it can be assured that the insole pad body 10 has been lifted from the ground. On the other hand, when the pressure value detected by the sensor 45 is larger than this threshold, it can be assured that the insole pad body 10 is pressed against the ground. The first micro-controller 54 will add 1 for each cycle. Accordingly, the mileage that the user has walked can be readily calculated.

3. Consumption of Calories

The approximate consumption of calories is first calculated from a multiplication of the pressure value and the number of stepping. Then this multiplication times a constant and the approximate consumed calories can be attained.

The radio transmitting circuit 55 includes a modulator 56, a first resonating circuit 57, a transmitting antenna 58, and a frequency-modulating device 59. The modulator 56 can convert the received value into an Amplitude Modulation frequency. Then this AM frequency is further transformed into a lower energy, super-high radio frequency by the first resonating circuit 57 of high frequency LC, and finally, this high radio frequency can be transmitted by the antenna 58. In this embodiment, the modulating device 59 for adjusting the radio frequency is attained by a variable capacitor C41.

Figure 5:
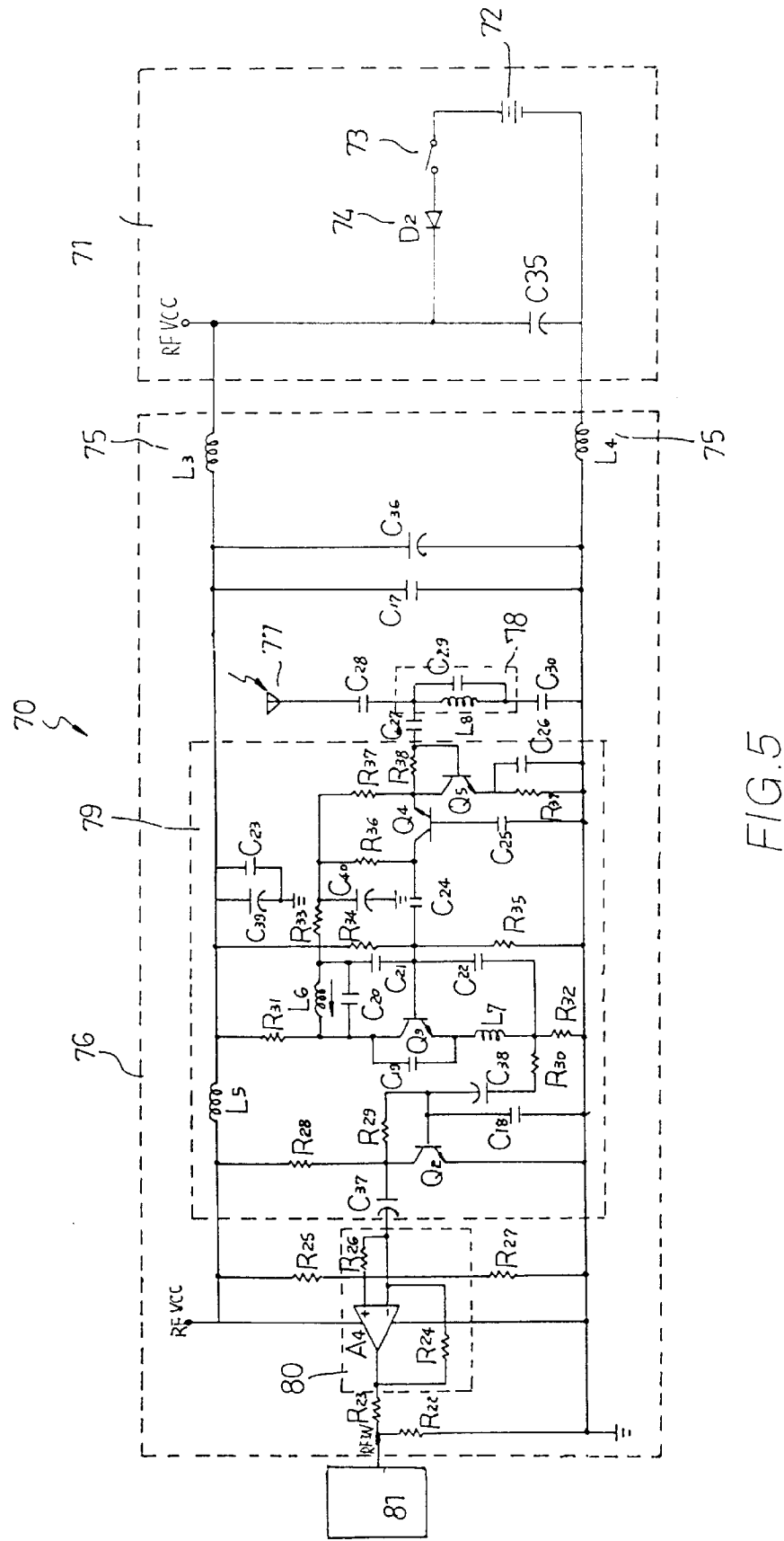
FIG. 5 is a circuitry of the receiving circuit of the step-counting device.
Figure 6:
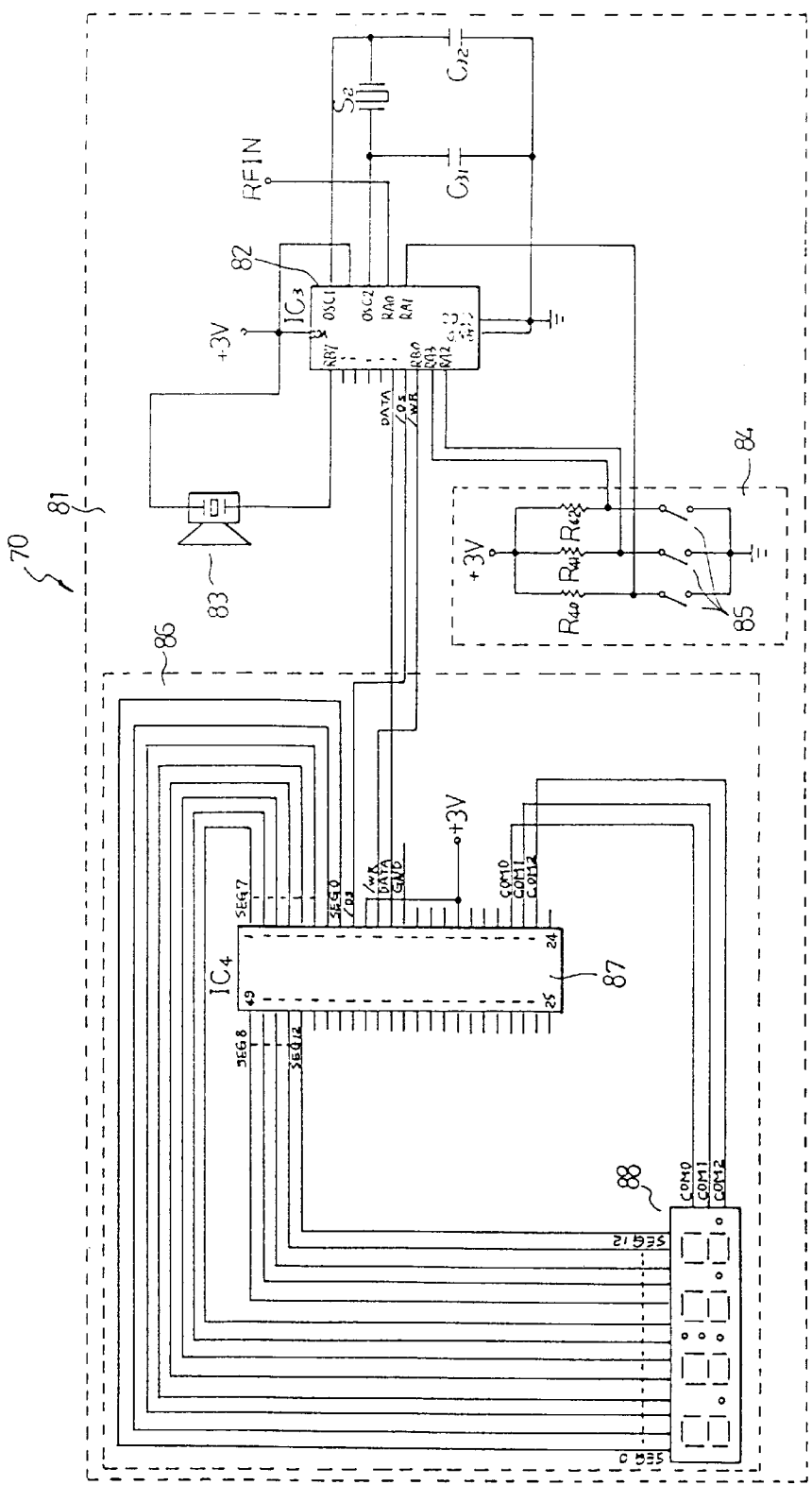
FIG. 6 is a circuitry of the controlling circuit of the receiving circuit of the step-counting device.

Referring to FIGS. 5 and 6, the receiving circuit 70 includes a second power circuit 71, a signal receiving circuit 76, a second amplifying circuit 79, a frequency-detecting circuit 80, and a receiving-controlling circuit 81.

The second power circuit 71 includes a pair of second batteries 72, a second switch 73, a breaker 74, and a plurality of filters 75. A pair of dc cells, which are connected in series, configures the second batteries 72. The battery can also be replaced by a mercury or lithium battery. The second switch 73 is used to control the on/off of the second power circuit 71 and the power can be shut off when not in use. The breaker 74 is a Ge-diode D1, accordingly the circuit can be suitably protected when the polarity of the first battery 42 is reversed.

The signal receiving circuit 76 can collect the radio frequency transmitted from the transmitting circuit 40. The signal receiving circuit 76 includes a filtering device 75, a receiving antenna 77, and a second resonating circuit 78. The radio frequency can be collected by the receiving antenna 77 and then be transmitted to the second resonating circuit 78. The second resonating circuit 78 is a tuner configured by the LC resonating. The radio frequency transmitted by the transmitting circuit 40 can be filtered and then be transmitted to the second amplifying circuit 79. In this embodiment, in order to avoid the collected radio signal being influenced by the interference, a pair of induces L3, L4 are configured with the filtering device 75.

Three transistors Q2, Q3 and Q4, that are connected in series, are configured with the second amplifying circuit 79. The radio frequency, which is collected and filtered can be further amplified. The amplified radio frequency is further transmitted to the frequency-detecting circuit 80 for detecting the frequency. The potential variation between whether there is a detected radio frequency can be verified. The potential variation is further transmitted to the receiving controlling circuit 81.

The receiving controlling circuit 81 includes a second micro-controller 82, a function selecting circuit 84, and a liquid crystal displaying circuit 86. The second micro-controller 82 can decode the signal transmitted from the frequency-detecting circuit 80. Finally, the value transmitted from the transmitting circuit 40 can be attained. The user may select the information through the function-controlling circuit 84. In this embodiment, there are three controlling buttons 85. By selecting each of the three controlling buttons 85, the pressure, the number of stepping, and the approximate consumed of the calories can be readily displayed by the liquid crystal displaying circuit 86. The liquid crystal displaying circuit 86 includes a liquid crystal display driver 87 and a liquid crystal display 88. The liquid crystal display driver may receive the given signal which can be used to drive the liquid crystal display 88. As a result, the user can be advised by the selected information. In this embodiment, the second micro-controller 82 is commercially available and is an IC bearing the model number PIC16C54.

Figure 7:
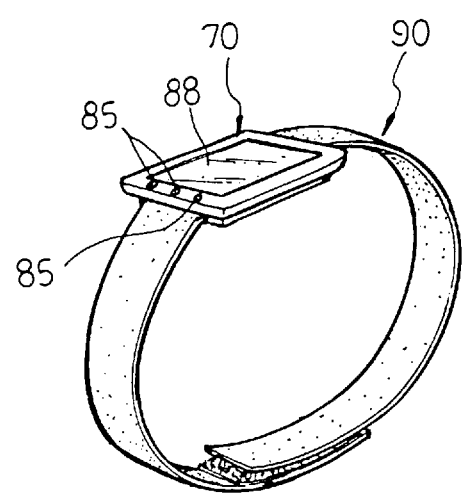

Referring to FIG. 7, in order to provide an easy access to the information, the receiving circuit 70 can be built into a watch 90.

On the other hand, in this embodiment, the receiving controlling circuit 81 is further provided with a beeper 83. The beeper 83 is a capacitor-type piezoelectric beeper and is electrically connected to the second micro-controller 82. The second micro-controller 82 is preset with a threshold, i.e. a certain amount of the stepping, the mileage, and the consumed calories. Accordingly, when the value from the transmitting circuit 40 is collected by the second micro-controller 82 and exceeds the preset threshold, the beeper 83 will be triggered so as to alarm the user.

Figure 8:
FIG. 8 is a schematic illustration of the use of a watch which is provided with a radio receiver.

Referring to FIG. 8, the connecting portion 30, the pressure sensor 45, the thermostat 50, and the transmitting circuit 40 are all disposed within the left insole pad body 10. And the value measured by the insole pad body 10 will be transmitted to the receiving circuit 70 or the watch 90. As a result, the user can be conveniently advised by the value displayed on the watch 90.

Since everyone needs to wear a pair of shoes when going outside or sporting, the removable insole pad body 10, that bearing a radio transmitter, can be disposed within the shoe while the watch 90 be worn onto the wrist of the user. Then the mileage, the numbers of stepping, and the approximate consumed of calories can be readily measured and displayed.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. An insole pad having step-counting device, which is removably disposed within a shoe, comprising:

a fluid bag having an outlet and being filled with a fluid;

a connecting portion being disposed at said outlet of said fluid bag;

a pressure-sensitive sensor being connected at said connecting portion, said sensor being capable of detecting a variation of pressure and converting said variation into a pressure signal;

a thermostat being connected with said sensor and being capable of detecting a variation of temperature and converting said variation of temperature into a temperature signal;

a transmitting circuit including a first power circuit, a first amplifying circuit, a converting circuit, a first micro-control circuit and a radio frequency (RF) transmitting circuit, said RF transmitting circuit being powered by said first power circuit, said sensor and said thermostat being electrically connected to said first amplifying circuit in which the incoming pressure and temperature signals can be amplified, wherein said amplified signals are further sent to said converting circuit such that said signals are converted into a frequency signal, respectively, said frequency signals being further transmitted to said first micro-control circuit in which said frequency signals will be counted and a value can be attained, said value being further modulated and then being transmitted by said RF transmitting circuit;

a receiving circuit being separately arranged from said transmitting circuit which includes a second power, a signal receiving circuit, a second amplifying circuit, a frequency detecting circuit and a receiving-controlling circuit, said receiving circuit being powered by said second power and wherein said RF signal transmitted from said transmitting circuit can be received and modulated by said receiving circuit, wherein said modulated signals are sent to said second amplifying circuit, said amplified signal being further detected by said frequency-detecting circuit and then being sent to said receiving-controlling circuit in which said signals are decoded and displayed; and an insole pad body for housing said fluid bag, said connecting portion, said sensor, said thermostat, and said transmitting circuit.

2. An insole pad having step-counting device as recited in claim 1, wherein said insole pad body is a hollow protecting lining.

3. An insole pad having step-counting device as recited in claim 1, wherein said insole pad body includes an upper protecting lining and a lower protecting lining.

4. An insole pad having step-counting device as recited in claim 1, wherein said insole pad body is an upper protecting lining.

5. An insole pad having step-counting device as recited in claim 1, wherein said insole pad body is a lower protecting lining.

6. An insole pad having step-counting device as recited in claim 1, wherein said first and second power circuits are provided with a breaker, respectively, and said breaker is a Ge-diode.

7. An insole pad having step-counting device as recited in claim 1, wherein said first amplifying circuit includes a plurality of amplifiers, a power adjusting element and a reset element.

8. An insole pad having step-counting device as recited in claim 1, wherein said converting circuit includes at least a converter, said first micro-control circuit includes at least a first micro-controller.

9. An insole pad having step-counting device as recited in claim 1, wherein said RF transmitting circuit includes a modulator, a first resonating circuit, an RF antenna, and an amplitude modulating element.

10. An insole pad having step-counting device as recited in claim 1, wherein said receiving circuit includes a plurality of filtering elements, a receiving antenna, a second resonating circuit, a second amplifying circuit, and a frequency detecting circuit.

11. An insole pad having step-counting device as recited in claim 1, wherein said receiving-controlling circuit includes a second micro-control circuit, a beeper, a function selecting circuit, and a liquid crystal displaying circuit, and wherein said liquid crystal displaying circuit includes a liquid crystal display driver and a liquid crystal display.

12. An insole pad having step-counting device as recited in claim 11, wherein said liquid crystal displaying circuit has a plurality of displaying modes, and said displaying modes can be readily changed by the function selecting circuit.

13. An insole pad having step-counting device as recited in claim 11, wherein said liquid crystal displaying circuit includes a displaying mode which is a pressure value displaying mode, the displaying value displayed on said liquid crystal display is transmitted from said first micro-controller in which said pressure signal sent from said sensor is calculated.

14. An insole pad having step-counting device as recited in claim 11, wherein said liquid crystal displaying circuit includes a displaying mode in which the number of stepping is displayed, and wherein the number of stepping is counted by said first micro-controller in which a cycle of increasing and decreasing values is counted, and the accumulated number of stepping is displayed on said liquid crystal display.

15. An insole pad having step-counting device as recited in claim 11, wherein said liquid crystal displaying circuit includes a displaying mode in which the consumed calories are displayed, the consumed calories are first calculated from a multiplication of said pressure value and numbers of stepping, said multiplication further times a constant and the approximate consumed calories are attained and are displayed on said liquid crystal display.

* * * * *